(12) United States Patent
Söderström

(10) Patent No.: US 6,832,776 B1
(45) Date of Patent: Dec. 21, 2004

(54) AIR-BAG ARRANGEMENT

(75) Inventor: Pontus Söderström, Rochester, MI (US)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/018,254

(22) PCT Filed: Jun. 19, 2000

(86) PCT No.: PCT/SE00/01290
§ 371 (c)(1),
(2), (4) Date: Mar. 26, 2002

(87) PCT Pub. No.: WO00/78576
PCT Pub. Date: Dec. 28, 2000

(30) Foreign Application Priority Data

Jun. 18, 1999 (GB) .............................. 9914267

(51) Int. Cl.⁷ .............................. B60R 21/22
(52) U.S. Cl. ................. 280/730.1; 280/729; 280/743.1; 280/749
(58) Field of Search ................. 280/733, 729, 280/730.1, 749, 743.1, 730.2

(56) References Cited

U.S. PATENT DOCUMENTS 5,788,270 A * 8/1998 Haland et al. ........... 280/730.2
5,839,756 A   11/1998 Schenck et al.
5,863,065 A * 1/1999 Boydston et al. ........... 280/733
6,158,766 A * 12/2000 Kowalski ................. 280/730.1

FOREIGN PATENT DOCUMENTS

| DE | 19727598 |   | 1/1999 |          |
|----|----------|---|--------|----------|
| DE | 19818121 |   | 5/1999 |          |
| FR | 2781443  |   | 1/2000 |          |
| GB | 2272670  | * | 5/1994 | 280/730.1 |
| GB | 2315713  |   | 2/1998 |          |
| WO | 98/05534 |   | 2/1998 |          |
| WO | 98/13226 |   | 4/1998 |          |
| WO | 99/30931 |   | 6/1999 |          |

* cited by examiner

Primary Examiner—Eric Culbreth
(74) Attorney, Agent, or Firm—Venable LLP; Robert Kinberg; Manni Li

(57) ABSTRACT

An air-bag unit (1) adapted to be positioned on a floor pan of a motor vehicle in the foot-well to be located beneath the feet of an occupant of the vehicle has a substantially sealed damp-proof housing containing an air-bag (11) formed of fabric, the housing having a substantially rigid upper cover (8), the unit being such that on inflation of the air-bag (11) the cover of the housing is lifted, from its initial position to an elevated position.

15 Claims, 4 Drawing Sheets

AIR-BAG ARRANGEMENT

Figure 1:
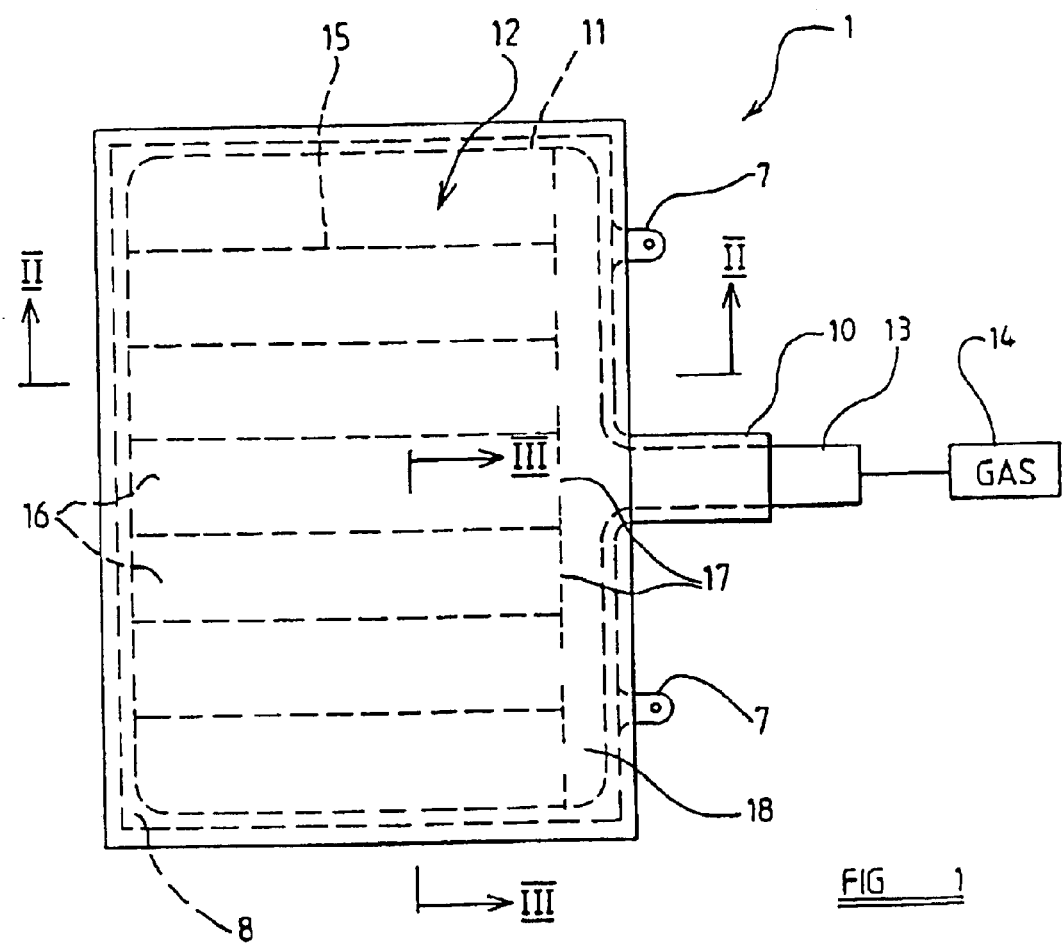

The present invention relates to an air-bag arrangement, and more particularly relates to an air-bag arrangement mounted in a motor vehicle.

When a motor vehicle is involved in an impact, especially a front impact, the floor pan of the vehicle may be distorted. The distortion of the floor pan may be such that, if no protection is provided, a very substantial upward acceleration is applied to the feet of an occupant of the vehicle. This acceleration, although being an acceleration of a very short distance, may lead to substantial injuries to the feet or ankles of the occupant of the vehicle.

It has been proposed to provide an air-bag or inflatable element located on the floor of the foot-well of a motor vehicle at a position beneath the feet of the occupant, the air-bag being adapted to be inflated as a consequence of an impact being detected, the inflated air-bag thus serving to lift the feet of the occupant above the floor pan of the vehicle, providing a desirable degree of protection.

Various difficulties have to be overcome in designing an air-bag for use in the foot-well of a motor vehicle, to lift the feet of the vehicle occupant. The air-bag should be mounted in position to cover, in the uninflated state, an area of the metal floor pan of the vehicle in the foot-well. Whilst the metal floor in the foot-well can, in some vehicles, be covered by a soundproofing material, which may be soft or resilient, in many motor vehicles no such soundproofing material is provided, and the floor pan of the vehicle thus presents a generally abrasive surface. If a conventional ail-bag is provided which is simply placed on the metal floor of the floor pan, in an uninflated state, with means being provided to inflate the air-bag at an appropriate moment, there is a risk that the air-bag will be damaged since the air-bag will, every time that the vehicle is used, be pressed between the carpet and the floor pan by the feet of the person ordinarily occupying the vehicle. Even if the air-bag is initially stored within a casing or housing, there is a risk that the air-bag will be punctured on inflation of the air-bag if parts of the air-bag come into contact with the floor of the vehicle.

It is to be appreciated that in many cases the space adjacent the floor of the vehicle within the foot-well of the vehicle, that is to say the space beneath the carpet and immediately above the floor pan, may become damp. If a conventional air-bag material is utilized in such an environment, there is a risk that the fabric may become mildewed and perish.

It is also to be appreciated that in a typical motor vehicle the floor or lower surface of the foot-well may be uneven or "structured". Thus the floor or lower surface of the foot-well may be provided with integral strengthening ribs or undulations. This can cause problems with the fitting of a conventional air-bag intended to lift the feet of the occupant of die vehicle, and may also lead to problems related to the distribution of a load passed through an air-bag provided to lift the feet of the occupant of the vehicle.

If a conventional air-bag is utilized at a position between the floor pan and the carpet of a motor vehicle, if the feet of the occupant are pressed firmly downwardly at the moment that the air-bag is inflated, initially the parts of the air-bag which are not subjected to the downward pressure from the feet will be inflated, and only as a final stage in the inflation of the air-bag will the part of the air-bag located immediately beneath the feet of the occupant be inflated so that the feet are actually lifted up above the floor pan. This is undesirable, since ideally the feet of the occupant should be lifted above the floor pan just as soon as possible when an impact of the vehicle is detected.

The present invention seeks to provide an improved air-bag arrangement.

According to one aspect of this invention there is provided an air-bag unit adapted to be positioned on the floor pan of a motor vehicle in the foot-well to be located beneath the feet of an occupant of the vehicle, the air-bag unit having a substantially sealed damp-proof housing containing an air-bag, the housing having a substantially rigid upper cover, the unit being such that on inflation of the air-bag the cover of the housing is lifted, from its initial position to an elevated position, wherein the cover of the housing is secured to the base of the housing, the cover being adapted to be separated from the base of the housing on inflation of the air-bag.

Preferably the cover is sonic-welded to the base of the housing.

According to another aspect of this invention there is provided an air-bag unit adapted to be positioned on the floor pan of a motor vehicle in the foot-well to be located beneath the feet of an occupant of the vehicle, the air-bag unit having a substantially sealed damp-proof housing containing an air-bag, the housing having a substantially rigid upper cover, the unit being such that on inflation of the air-bag the cover of the housing is lifted, from its initial position to an elevated position, wherein the cover is secured to a base part of the housing by means of a deformable side wall.

The side wall may be a concertina-style side wall.

It is to be appreciated that a sealed damp-proof housing will minimize the risk of a fabric air-bag deteriorating even if the air-bag is in a potentially damp environment.

Preferably the housing is provided with mounting means to mount the unit in position.

Conveniently the air-bag comprises two super-imposed layers of fabric, the layers being secured together to define a plurality of discrete cells.

Advantageously the cells comprise a plurality, of substantially parallel cells which are substantially cylindrical when inflated.

In an alternative embodiment the cells comprise a plurality of cells configured so that on inflation of the cells one end of each cell has a greater diameter than the other end of the cell. Thus the cells may be substantially triangular.

Preferably the air-bag is provided with a gas supply tube adapted to be connected to a gas generator.

The unit may be provided in combination with a gas generator connected to the gas supply tube, the gas generator being associated with a sensor adapted to respond to an impact.

In an alternative embodiment of the invention a gas generator is provided within the housing to provide gas to inflate the air-bag.

Conveniently electrical connection means are provided to enable means supplying a signal adapted to initiate inflation of the air-bag to be connected to the gas generator. Preferably the unit has a substantially rigid base.

In one embodiment of the invention the base has a deformable peripheral region, a terminal lip of the peripheral region being secured to the cover.

Figure 2:
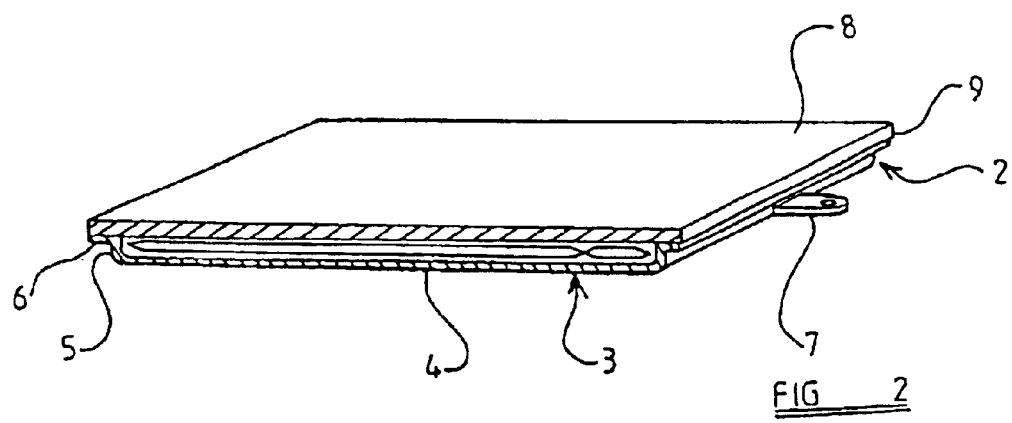
Figure 3:
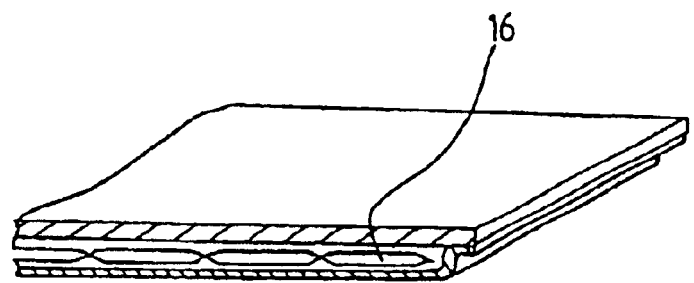
Figure 4:
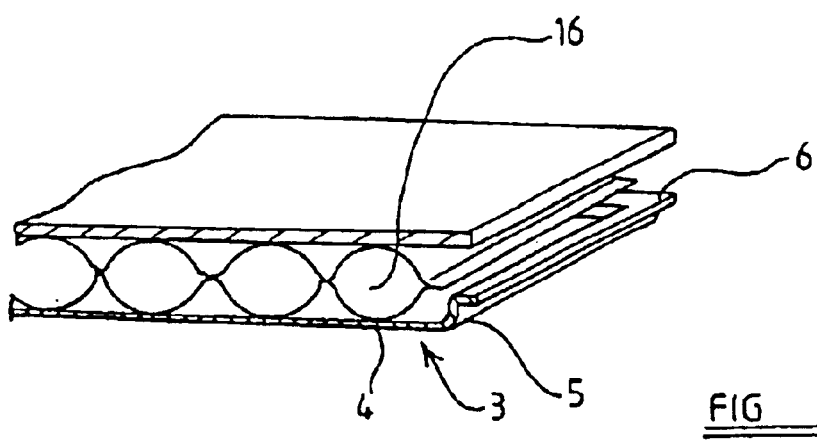
Figure 5:
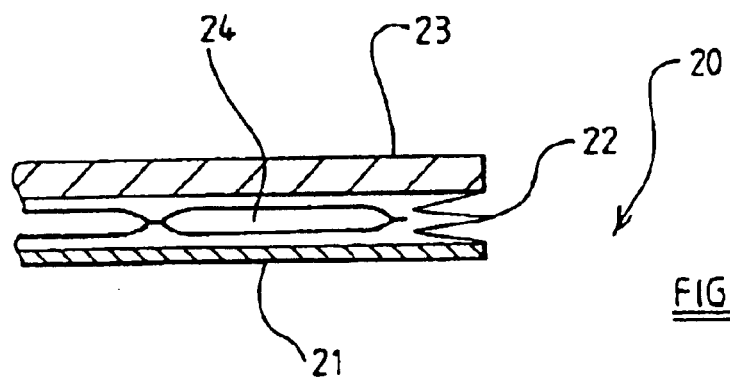
Figure 6:
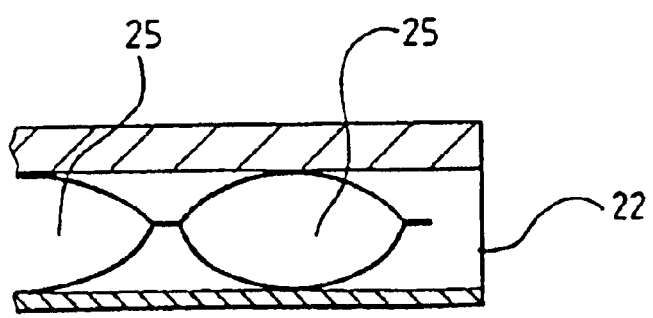
Figure 7:
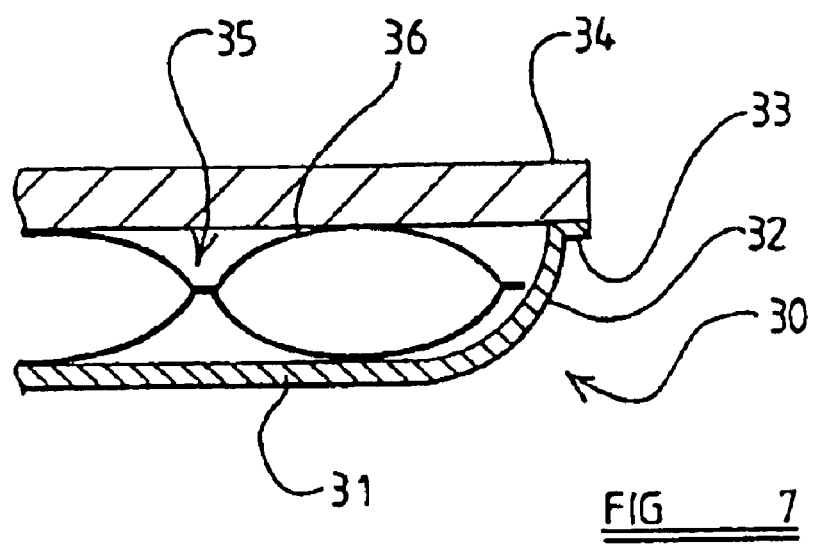
Figure 8:
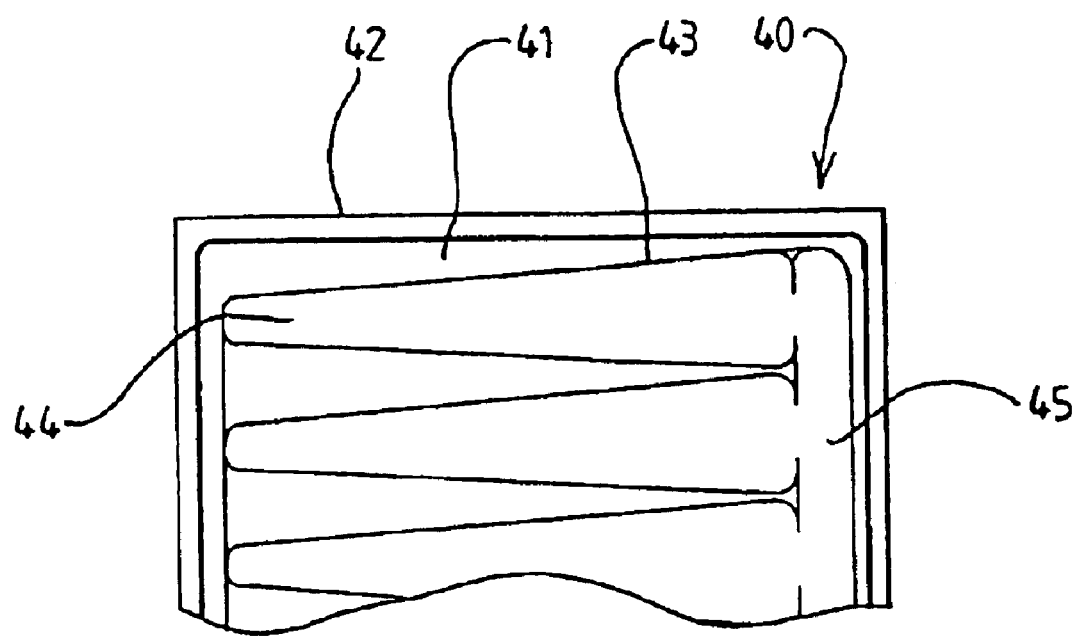
Figure 9:
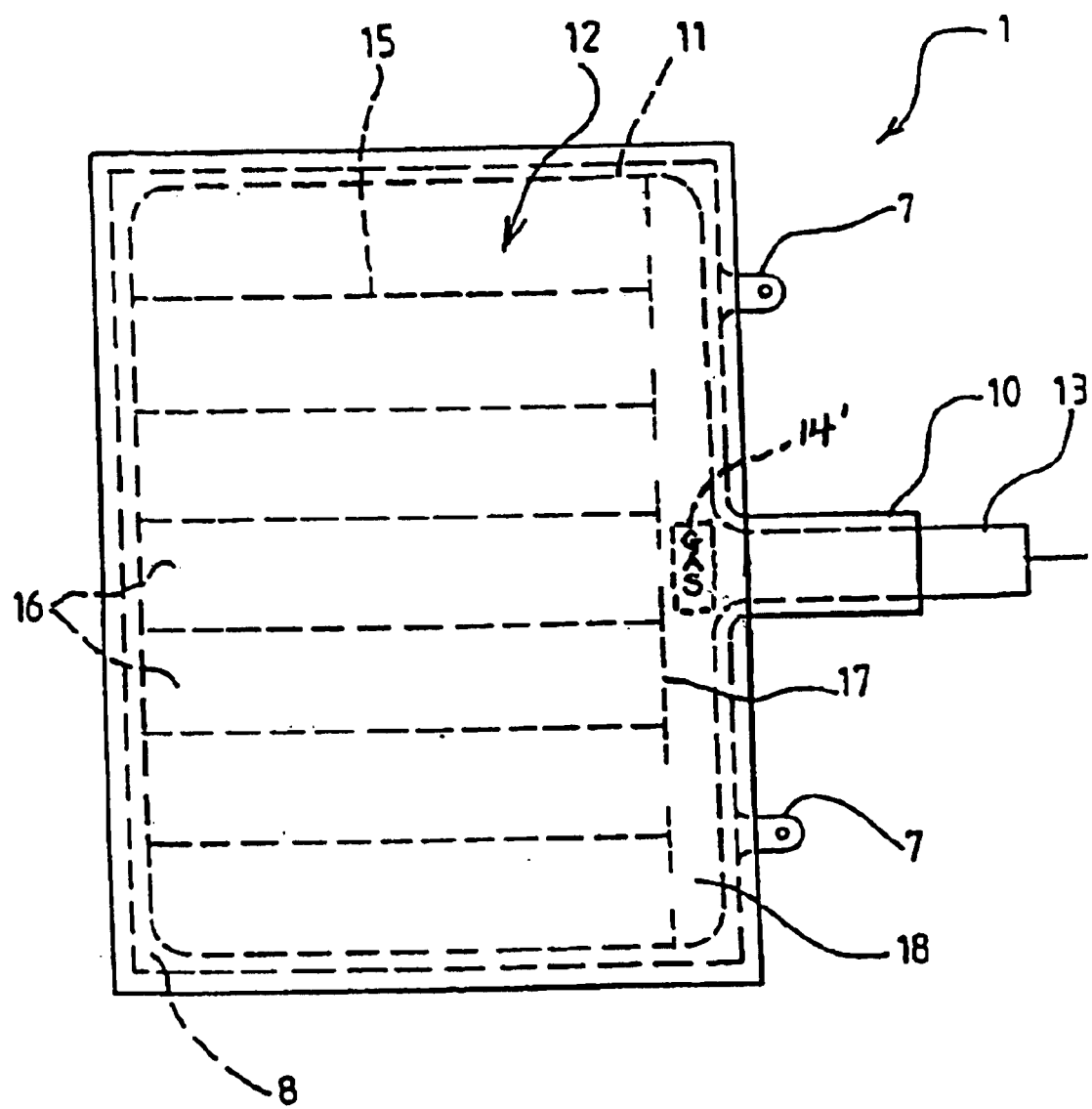

In order that the invention may be more readily understood, and so that further features thereof may be appreciated, the invention will now be described, by way of example, with reference to the accompanying drawings in which:

FIG. 1 is a top plan view, with parts shown in phantom, of an air-bag unit in accordance with the invention, FIG. 2 is a cut-away sectional view taken on the line II—II of FIG. 1, FIG. 3 is a sectional view taken on the line III—III of FIG. 1 showing the air-bag in the uninflated state, FIG. 4 is a view corresponding to FIG. 3 showing the air-bag in an inflated state, FIG. 5 is a view corresponding to FIG. 3 illustrating an alternative embodiment of the invention, FIG. 6 is a view, corresponding to FIG. 4, illustrating the embodiment of the invention shown in FIG. 5, FIG. 7 is a sectional view, corresponding to FIG. 5, illustrating a further alternative embodiment of the invention, FIG. 8 is a plan view illustrating yet another embodiment of the invention, FIG. 9 is a schematic showing of a top plan view, with parts shown in phantom, of an airbag unit in accordance with the invention, while the gas generator 14' is provided within the housing.

Referring initially to FIG. 1 of the accompanying drawings, an air-bag unit 1 is illustrated. The air-bag unit is intended to be mounted on the floor pan of a motor vehicle in the foot-well immediately beneath the feet of an occupant of the vehicle. The unit may be covered by a carpet or the like, or may be formed integrally with a carpet or the like.

The unit 1 comprises a moisture and damp-proof sealed rectangular housing 2 made of a plastics material. The housing 2 comprises a lower portion 3 having a flat base 4 and a peripheral upstanding side wall 5, the upstanding side wall 5 terminating with an outwardly directed flange 6. The base 4 is provided with a plurality of fixing lugs 7 projecting outwardly therefrom adapted to be connected to appropriate anchoring points provided on the floor pan of the vehicle. The base of the unit may be substantially rigid.

A substantially rigid cover 8 is provided which is mounted on the lower portion 3. The peripheral portion of the cover 8 rests on the outwardly extending flange 6 provided at the top of the side wall 5 and is connected thereto, for example, by sonic welding 9. This connection is damp-proof.

One part of the side wall 5 is provided with a horizontally outwardly extending hollow conduit 10.

Contained within the housing 2 is an air-bag 11. The air-bag 11 has an inflatable region 12 having a rectangular shape equivalent to that of the housing 2 and a size slightly less than the size of the lower portion 3 of the housing 2, so that the inflatable part of the air-bag can be laid out, in a substantially flat condition, between the base 4 and the cover 8. The inflatable part of the air-bag 12 is provided with a gas supply tube 13 which extends through the conduit 10 to a gas generator 14 which incorporates an appropriate sensor adapted to sense an impact situation.

The air-bag 11 is formed of fabrics, such as a conventional air-bag fabric, and is constituted by two superimposed layers of fabric secured together by seams, such as the seam 15. The seams serve to divide the interior of the air-bag into a plurality of parallel cells 16, each of which communicate, by means of a gas supply opening 17 with a transversely extending gas distribution duct 18. The cells, in the uninflated state, are of a substantially uniform width.

It is to be appreciated that when the sensor within the gas generator 14 senses an impact situation, the gas generator 14 is actuated and supplies gas through the gas supply tube 13 to the gas distribution duct 18 within the interior of the air-bag 11. Gas is thus supplied through the gas supply openings 17 into the cells 16. The cells 16 thus inflate. As the cells 16 inflate, they each assume a cylindrical form, and it will therefore be appreciated that the inflated air-bag 11 then presents a plurality of cylindrical parallel adjacent cells 16, each of which has a substantial diameter. The diameter of the cells is uniform along the length of the cells. The inflation of the cells selves to separate the rigid cover 8 of the housing 2 from the base 4, lifting the rigid cover 8 upwardly. The rigid cover 8 rises in a uniform manner without tilting. The lower part of the inflatable air-bag is retained within the confines of the lower portion 3 of the housing 2 during inflation of the air-bag and, indeed, as a consequence of the inflation of the cells 16, which increases the diameter of each of the cells 16, the overall width of the air-bag 11, measured transversely to the direction of the longitudinal axes of the cells 16, will tend to decrease.

The rigid cover will raise the feet of the occupant regardless of where the feet of the occupant are located on the top surface of the cover.

It is to be appreciated, therefore, that in use of the described embodiment of the invention, a conventional air-bag fabric may be utilized for the air-bag 11 because the air-bag fabric does not come into contact with the floor pan of the vehicle, either before or during inflation, and consequently there is no risk that the air-bag will become damaged due to contact with the abrasive floor pan of the vehicle. Indeed the air-bag is contained within a sealed protective housing until the moment of inflation, and even following inflation, the air-bag only contacts material that initially formed the housing.

The housing is formed to be moisture and damp-proof, and consequently the fact that the air-bag, within the housing, is located at a position that may be subject to damp, does not give rise to any problems.

Because the upper cover of die housing is of substantially rigid material, the cover will rise, regardless of where the feet of the occupant are located on the cover at the moment of inflation of the air-bag.

Because the base of the housing is substantially rigid, the housing will be able to transmit an appropriate force to the floor pan of the motor vehicle, even if the floor pan is structured or provided with integral ribs.

It will be appreciated that in the presently described embodiment, as the cover 8 rises on inflation of the air-bag, the sonic weld between the cover and the outwardly directed flange 6 provided at the top of the side wall 5 of the lower portion 3 of the housing is broken.

FIGS. 5 and 6 illustrate a modified embodiment of the invention in which a housing 20 comprises a substantially rigid planar base 21 having a peripheral concertina-style side wall 22 which extends upwardly and which is connected to the periphery of a rigid cover 23. An air-bag 24 corresponding directly to the air-bag 11 described above is located within the housing, being positioned between the planar base 21 and the rigid cover 23. It is to be appreciated that on inflation of the air-bag 24, as shown in FIG. 5, the air-bag will again present a plurality of cylindrical cells of uniform diameter, illustrated in FIG. 6 as the inflated cells 25. As a consequence of inflation of the air-bag, the cover 23 rises, whilst the concertina side wall 22 becomes substantially straightened. Thus, in this embodiment of the invention, the housing remains substantially sealed even after inflation of the air-bag.

Referring now to FIG. 7 of the accompanying drawings, in a modified embodiment of the invention a housing 30 is provided which comprises a substantially rigid base 31 having, at its periphery, an area 32 of reduced thickness, a very peripheral lip 33 of which is secured, for example by means of sonic welding, to the periphery of a substantially rigid cover 34. An air-bag 35 corresponding directly to the air-bag 11 described above is located within the housing being positioned between the planar base 31 and the cover 34. It is to be appreciated that on inflation of the air-bag 35, as shown in FIG. 7, the air-bag will again present a plurality of cylindrical cells 36 of uniform diameter. As a consequence of inflation of the air-bag, the cover 34 rises, whilst the peripheral region 32 of the base 31 of reduced thickness adopts an arcuate form, thus constituting an upwardly inclined side wall of the housing.

It is to be appreciated that in the embodiment described with reference to FIG. 7 the lip 33 remains secured to the cover 34 on inflation of the air-bag 35, so that the housing, which is initially in a sealed condition, remains in the sealed condition during inflation of the air-bag.

FIG. 8 illustrates a further modified embodiment of the invention in which a housing 40 is provided which has a base 41 provided with an upstanding side wall having a peripheral lip 42. The lip 42 is secured to a cover as in the earlier described embodiments of the invention. The housing contains an air-bag 43. The air-bag 43 defines a plurality of substantially triangular cells 44 which are co-aligned, the ends of the cells 44 of greater width being immediately adjacent each other, and the ends of the cells of less width also being adjacent each other. The air-bag incorporates a gas duct up to 45 adapted to supply gas to the ends of the cells of greater width.

It is to be appreciated that on inflation of the air-bag 43 the cells 44 will inflate and each cell will adopt a generally conical form, having one end, adjacent the gas duct 45, with a relatively large diameter and the other end, the end remote from the gas duct 45, with a relatively small diameter. Thus the cover will be moved to a position in which the cover is both elevated and inclined relative to its initial position. The unit illustrated in FIG. 8 will be so position that the cover, when elevated and inclined, will move the foot or feet of the occupant to a desired position, with the toe of the foot being moved a different distance than the distance moved by the heel of the foot.

Whilst, in the described embodiments of the invention, the gas generator is located on the exterior of the housing 2 of the unit 1, in a modified embodiment of the invention as illustrated in FIG. 9, the gas generator may be provided within the housing. In such an embodiment it is only necessary to provide an electrical connection, accessible from the exterior of the housing, which is connected to the gas generator to enable means to provide an electric signal to initiate inflation of the air-bag to be connected to the gas generator.

What is claimed is:

1. An air-bag unit positioned on a floor pan of a motor vehicle in a foot-well comprising
   a substantially sealed damp-proof housing, and
   an air-bag in the housing,
   wherein the housing has a substantially rigid upper cover and a base, and the upper cover is secured to the base, and
   wherein on inflation of the air-bag, the upper cover is lifted from an initial position to an elevated position so that the upper cover is separated from the base.

2. A unit according to claim 1, wherein the upper cover is sonic-welded to the base.

3. A unit according to claim 1, wherein the housing is provided with mounting means to mount the unit in position.

4. A unit according to claim 1, wherein the air-bag comprises two superimposed layers of fabric, and the layers are secured together to define a plurality of discrete cells.

5. A unit according to claim 4, wherein the cells comprise a plurality of substantially parallel cells which are substantially cylindrical when inflated.

6. A unit according to claim 4, wherein the cells comprise a plurality of cells configured so that on inflation of the cells, one end of each cell has a greater diameter than the other end of the cell.

7. A unit according to claim 6, wherein the cells are substantially triangular.

8. A unit according to claim 1, wherein the air-bag is provided with a gas supply tube adapted to be connected to a gas generator.

9. A unit according to claim 8, wherein the gas generator is connected to the gas supply tube, and the gas generator is associated with a sensor adapted to respond to an impact.

10. A unit according to claim 1, wherein a gas generator is disposed within the housing to provide gas to inflate the air-bag.

11. A unit according to claim 10, wherein a means for supplying a signal adapted to initiate inflation of the air-bag is connected to the gas generator through an electrical connection means.

12. A unit according to claim 1, wherein the base is substantially rigid.

13. An air-bag unit positioned on a floor pan of a motor vehicle in a foot-well comprising
   a substantially sealed damp-proof housing, and
   an air-bag in the housing,
   wherein the housing has a substantially rigid upper cover, and the upper cover is secured to a base part of the housing by means of a deformable side wall, and
   on inflation of the air-bag, the upper cover is lifted from an initial position to an elevated position.

14. A unit according to claim 13, wherein the side wall is a concertina side wall.

15. An air-bag unit positioned on a floor pan of a motor vehicle in a foot-well, comprising:
   a substantially sealed damp-proof housing, and
   an air-bag in the housing,
   wherein the housing has a substantially rigid upper cover and a substantially rigid base, and the upper cover is secured to the base, and
   wherein on inflation of the air-bag, the upper cover is lifted from an initial position to an elevated position, and
   wherein the base has a deformable peripheral region, and a terminal lip of the peripheral region is secured to the cover.

* * * * *